May 1, 1951     C. R. BERGMAN     2,551,236
MINNOW TRAP
Filed Nov. 15, 1946
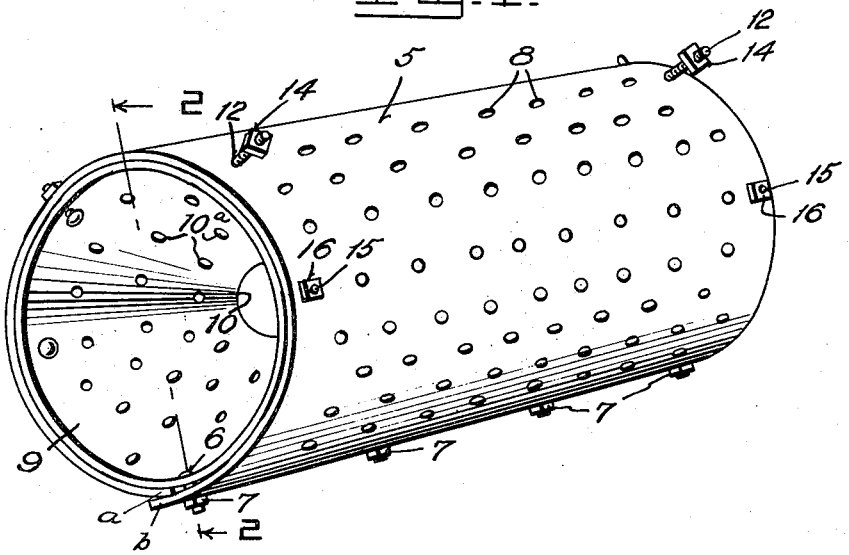
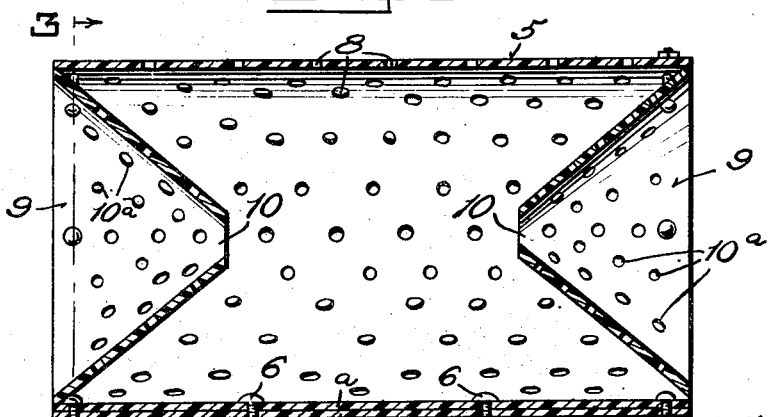
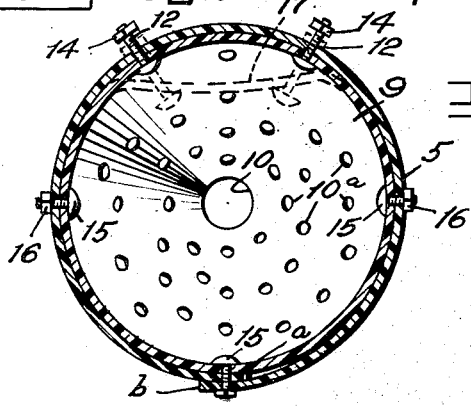
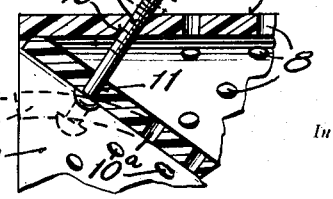
Inventor
Carl R. Bergman
By *Randolph & Beavers*
Attorneys Patented May 1, 1951

2,551,236

UNITED STATES PATENT OFFICE 2,551,236

MINNOW TRAP

Carl R. Bergman, Minocqua, Wis.

Application November 15, 1946, Serial No. 710,110

2 Claims. (Cl. 43—100)

The present invention relates to the general art of fishing and trapping and more particularly to a minnow trap.

Minnow traps have been constructed of glass and wire mesh, and while they have served their purposes, there has been certain objections to the materials employed. Glass traps break easily and they are difficult to manufacture because of the necessity of having openings in the side walls thereof. Wire mesh traps are objectionable, because when such traps are lifted, water quickly escapes therefrom, leaving the minnows in a frantic state, and resulting in injuries to a considerable percentage, this quickly causing a condition eventuating in a fungus growth on the injured minnows, promptly causing their demise.

The principal object of the present invention is to provide a minnow trap, preferably constructed of a transparent plastic, which will eliminate the objections to the use of wire mesh traps and present a trap which is not only transparent, but capable of being drilled to form the necessary openings, and this to whatever extent is desired in controlling the escape of water, when the trap is lifted for the releasement of the catcher's minnows.

A further object of the invention is to provide a minnow trap, wherein the parts can be easily and quickly formed, as well as assembled to produce a trap having the capturing ability of practically all types of minnow traps, without any of their objectionable factors.

These and various other objects and advantages of the invention, will become apparent to the reader of the following description.

In the drawing:

Figure 1 is a perspective view of the trap;

Figure 2 is a longitudinal sectional view taken on line 2—2 of Figure 1;

Figure 3 is a transverse sectional view taken on line 3—3 of Figure 2;

Figure 4 is a fragmentary enlarged detailed sectional view through one end of the trap.

Referring to the drawing, the side wall of the trap consists of a sheet 5 of a thin transparent flexible plastic material, this sheet being formed to a tube and having its overlapping edge portions a, b apertured to receive securing bolts 6, which are equipped with nuts 7.

At desired intervals, the wall 5 is formed with openings 8, through which water can drain, when the trap has been lifted for the releasement of captured minnows.

Disposed into each end of the wall 5 is a funnel entrance or cone 9 having its apex removed to form an entrance opening 10 of the desired size, this being regulated by certain State fish and game regulations.

The cones 9 are formed with a plurality of openings 10a for the ingress and egress of water and in addition, each cone 9 has certain openings 11 through which inclined bolts 12 are disposed, these bolts extending through openings 13 in the upper portion of the wall 5 where they are equipped with nuts 14, which are in spaced relation to the heads of said bolts limiting downward movement of the bolts, as when flexing the upper portion of the corresponding cone 9 to release captured minnows. It is preferable that the nuts 14 be fixed in their positions upon the bolts 12 and at such distance from the bolt heads as to permit a certain amount of movement of the adjacent portions of the cone 9 from the wall 5.

Botton and side portions of the cones 9 are secured positively to the opposed potions of the wall 5 by bolts 15 and nuts 16. The cones 9 are likewise made of transparent plastic, either of the same gauge as the wall 5 or finer to permit easier flexing of the upper portions thereof, to the extent substantially shown in broken lines in Figure 3 to define an opening 17 sufficiently large for the escape of the minnows into a collection receptacle.

It can be seen that a piece of bait placed in the trap can be easily seen by minnows at the outside and these minnows will move around the trap until the entrance openings 10 are found and after entering the trap, will find difficulty in escaping, especially after a few have been caught in the trap. As a matter of fact, it is not apt that the minnows will suspect that they have been trapped and will continue to feed on the bait for a substantial period of time and until the trap is hauled in and water begins to drain through the openings 8, just before the trapper disposes one end of the trap over his collection receptacle and flexes the upper portion of one of the cones 9 to allow for the opening 17, through which the captured minnows are dispensed into the collection receptacle.

In fast moving streams, the openings will only be in one end of the funnel and just a few openings in the body, so that the fast moving stream will not have a tendency to wash out the bait. It is also preferable that the bolts and perhaps the nuts be colored, this for the purpose of attracting the minnows, and certain portions of the trap may have colored designs or marks thereon, which will also assist in attracting the minnows.

By limiting the number of openings in the wall 5, a substantial amount of the water will remain in the trap until it is about ready to be dumped of its minnow contents.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A device of the character described comprising a cylindrical body having perforations therein, a truncated cone of flexible material extending into each end of said body, fixed fastening devices interconnecting the larger part of the base portions of the cones to points adjacent the outer ends of the body and inwardly movable fastening devices interconnecting the remaining base portions of the cones and points adjacent the outer ends of the body.

2. A device of the character described comprising a cylindrical body having perforations therein, a truncated cone of flexible material extending into each end of said body, fixed fastening devices interconnecting the larger part of the base portions of the cones to points adjacent the outer ends of the body and inwardly movable fastening devices interconnecting the remainder of the base portions of the cones and points adjacent the outer ends of the body, said inwardly movable fastening devices comprising for each cone a spaced pair of bolts each provided with a shank extending outwardly of the body and having a nut mounted adjacent its outer end.

CARL R. BERGMAN.

REFERENCES CITED

The following references are of record in the file of this patent:

UNITED STATES PATENTS

| Number | Name | Date |
|---|---|---|
| D. 46,993 | Getz | Feb. 23, 1915 |
| 584,378 | Lewis | June 15, 1897 |
| 914,571 | Heath et al. | Mar. 9, 1909 |
| 1,804,684 | Goodlet | May 12, 1931 |
| 1,827,437 | Pascoe | Oct. 13, 1931 |
| 1,976,134 | McPike | Oct. 9, 1931 |